(12) United States Patent
Sonnathi et al.

(10) Patent No.: US 11,837,867 B2
(45) Date of Patent: Dec. 5, 2023

(54) HVDC TRANSMISSION SCHEMES

(71) Applicant: GENERAL ELECTRIC TECHNOLOGY GMBH, Baden (CH)

(72) Inventors: Chandra Mohan Sonnathi, Stafford (GB); Radnya Anant Mukhedkar, Stafford (GB); Jordann Raymond Martial Brionne, Paris (FR); Damien Pierre Gilbert Fonteyne, Stafford (GB)

(73) Assignee: General Electric Technology GmbH, Baden (CH)

( * ) Notice: Subject to any disclaimer, the term of this patent is extended or adjusted under 35 U.S.C. 154(b) by 251 days.

(21) Appl. No.: 17/050,739

(22) PCT Filed: Apr. 11, 2019

(86) PCT No.: PCT/EP2019/059353
§ 371 (c)(1),
(2) Date: Oct. 26, 2020

(87) PCT Pub. No.: WO2019/206671
PCT Pub. Date: Oct. 31, 2019

(65) Prior Publication Data
US 2021/0119444 A1    Apr. 22, 2021

(51) Int. Cl.
*H02J 3/36* (2006.01)
*H02J 3/00* (2006.01)
*H02H 1/00* (2006.01)
*H02H 7/26* (2006.01)

(52) U.S. Cl.
CPC .............. *H02J 3/36* (2013.01); *H02H 1/0007* (2013.01); *H02H 7/268* (2013.01); *H02J 3/001* (2020.01); *H02J 3/00125* (2020.01)

(58) Field of Classification Search
CPC .......... H02H 1/0007; H02H 7/268; H02J 3/36
See application file for complete search history.

(56) References Cited

U.S. PATENT DOCUMENTS 10,374,412 B2 *  8/2019  Nyberg ............... H02H 7/1203
2009/0316446 A1 * 12/2009  Astrom .................... H02J 3/36
                                                         363/35
(Continued)

FOREIGN PATENT DOCUMENTS

WO    2008/112907 A1    9/2008
WO    2017/063664 A1    4/2017
WO    2019/0180079 A1   9/2019

OTHER PUBLICATIONS

European Search Report issued in European Application No. 18169983, dated Sep. 10, 2018, 11 pages.
(Continued)

*Primary Examiner* — Jue Zhang
*Assistant Examiner* — Afework S Demisse
(74) *Attorney, Agent, or Firm* — Eversheds Sutherland (US) LLP

(57) ABSTRACT

The present invention provides a high voltage direct current (HVDC) transmission system (300, 600) comprising: a first station (102) comprising series-connected first and second HVDC converters (110, 130); a second station (104) comprising series-connected third and fourth HVDC converters (150, 170), wherein a neutral node (164) coupling the third HVDC converter (150) to the fourth HVDC converter (170) is coupled to earth; a first transmission line (200) connecting a positive node (114) of the first HVDC converter (110) to a corresponding positive node (154) of the third HVDC converter (150), wherein a first pole (240) of the system (300, 600) comprises the first HVDC converter (110), the third HVDC converter (150) and the first transmission line (200); a second transmission line (210) connecting a negative node (138) of the second HVDC converter (130) to a corresponding negative node (178) of the fourth HVDC converter (170), wherein a second pole (250) of the system (300, 600) comprises the second HVDC converter (130), the
(Continued)

fourth HVDC converter (170) and the second transmission line (210); characterised in that: a neutral node (124) connecting the first HVDC converter (110) to the second HVDC converter (130) is coupled to a parallel combination of a resistance (310) and a neutral bus ground switch (312) for coupling the neutral node (124) to earth.

15 Claims, 14 Drawing Sheets

(56) References Cited

U.S. PATENT DOCUMENTS

| | | | |
|---|---|---|---|
| 2012/0033462 A1* | 2/2012 | Juhlin | H02J 3/36 363/35 |
| 2020/0266721 A1 | 8/2020 | Mukhedkar et al. | |

OTHER PUBLICATIONS

International Search Report & Written Opinion issued in International Application No. PCT/EP2019/059353, dated May 17, 2019, 13 pages.

Vahrenholt et al., "Substation layout for multi-terminal HVDC systems and neutral conductor arrangements for reduced field emissions," 11th IET International Conference on AC and DC Power Transmission 2015: Birmingham, United Kingdom, dated Feb. 10-12, 2015, pp. 224-229.

\* cited by examiner

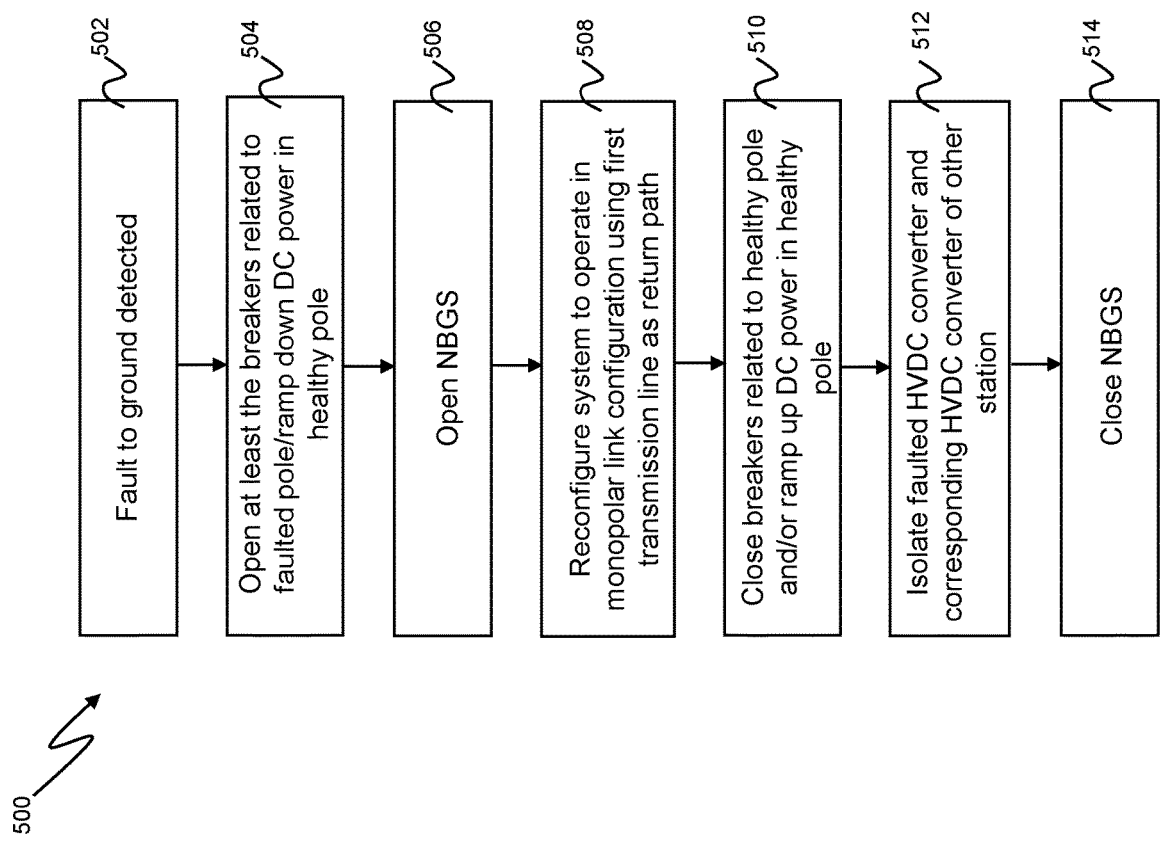

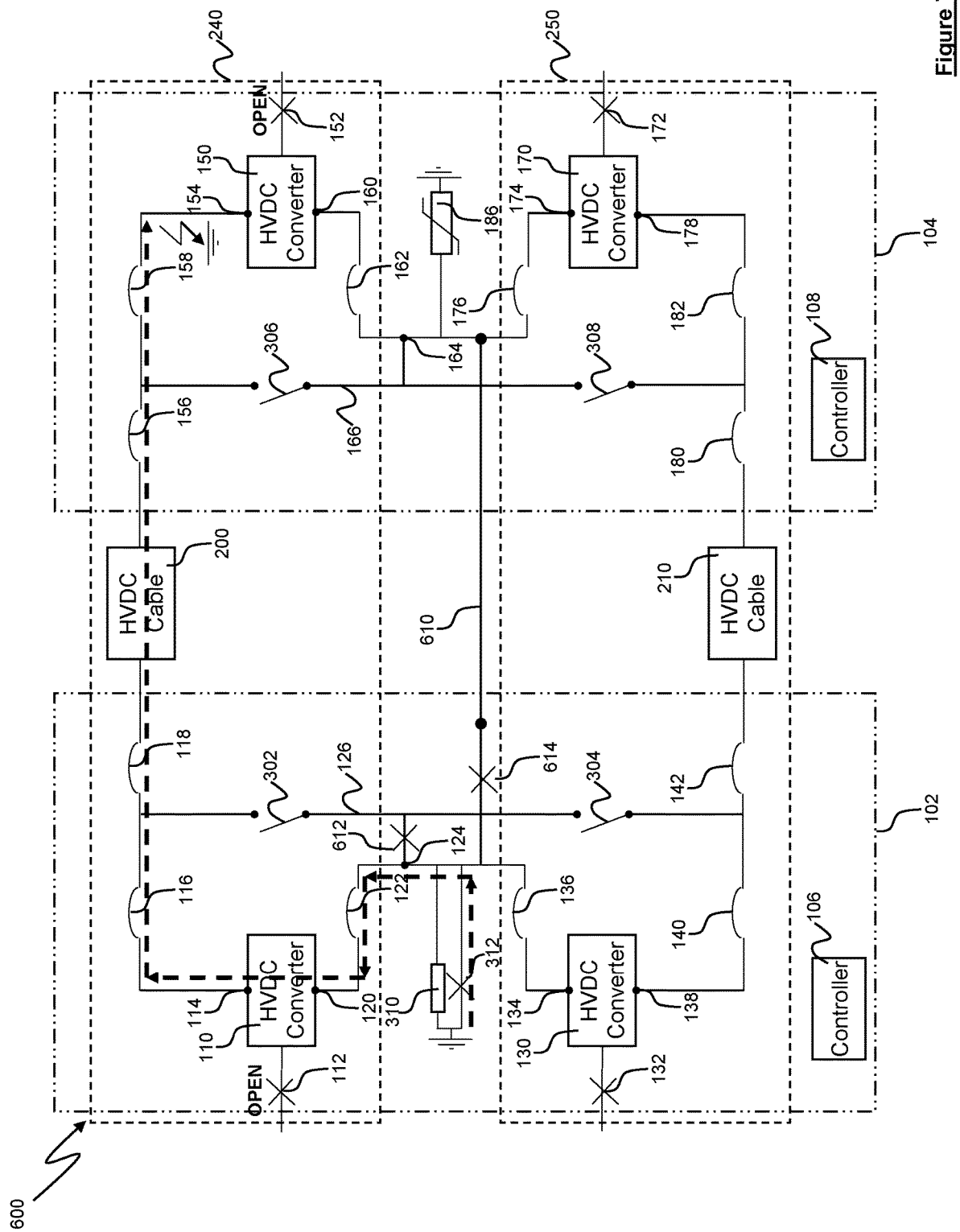

HVDC TRANSMISSION SCHEMES

CROSS-REFERENCE TO RELATED APPLICATIONS

This application is a U.S. National Stage Application under 35 U.S.C. 371 and claims the priority benefit of International Application No. PCT/EP2019/059353, filed Apr. 11, 2019, which claims priority to European Application No. 18169983.6, filed Apr. 27, 2018, which are both incorporated herein by reference.

FIELD OF THE INVENTION

The present disclosure relates to systems and methods for transmission of high voltage direct current (HVDC) power.

BACKGROUND

High voltage direct current (HVDC) power transmission is a cost-effective way of transmitting electrical power over long distances. In HVDC systems alternating current (AC) electrical power is converted by an HVDC converter at a first station to HVDC electrical power for transmission over overhead or undersea cables to a destination. At the destination, the HVDC power is converted back to AC power by an HVDC converter at a second station, for onward distribution to end-user sites via an electrical distribution network.

The first and second stations may be linked by a monopolar link, in which an electrically conductive (e.g. metallic) transmission line links a first live high-voltage (relative to ground), node of an HVDC converter of the first station to a corresponding first node of an HVDC converter of the second station, whilst a second node of the HVDC converter of the first station and a corresponding second node of the HVDC converter of the second station are connected to earth using earth electrodes. Thus, in this arrangement the earth acts as a return path for current. The second nodes of the HVDC converters of the first and second stations may also be connected by a second electrically conductive (e.g. metallic) transmission line, in which case the second transmission line provides a dedicated return path for current.

Alternatively, the first and second stations may be linked by a bipolar link. In a bipolar link two HVDC converters are connected in series in each of the first and second stations. A first electrically conductive (e.g. metallic) transmission line links a first live high-voltage (which is configured to be positive, relative to ground), node of a first HVDC converter of the first station to a corresponding first live high-voltage (also configured to be positive relative to ground), node of a first HVDC converter of the second station, forming a first pole of the system. A second electrically conductive (e.g. metallic) transmission line links a second live high-voltage (which is configured to be negative, relative to ground) node of a second HVDC converter of the first station to a corresponding second live high-voltage (also configured to be negative relative to ground) node of a second HVDC converter of the second station, forming a second pole of the system. Thus in this arrangement currents flowing in the first transmission line and the second transmission line are of opposite polarity. A third, neutral, node of the first station, which connects the first and second HVDC converters of the first station, is connected to earth, whilst a corresponding third, neutral, node of the second station, which connects the first and second HVDC converters of the second station, is also connected to earth. A return path is also provided, either by an additional electrically conductive (e.g. metallic) transmission line that connects the third nodes of the first and second stations, or by a ground return, in which case earth electrodes are used to connect the third electrodes of the first and second stations to earth.

An advantage of a bipolar transmission system is that in the event of a fault in one of the poles, the return path (either earth or a dedicated return path) can be used in place of the faulty pole, which allows the system to continue to operate, albeit at a reduced capacity, as a monopolar link. The system can subsequently be reconfigured to commutate current from the return path to the transmission line of the faulty pole, employing the transmission line of the faulty pole as a current return path. Thus the system can continue to operate as a monopolar link while the faulty pole is returned to service.

In one variant of the bipolar link system, known as a rigid bipolar link, no return path is provided for current; there is no additional electrically conductive (e.g. metallic) transmission line or ground return employing earth electrodes connecting the stations. In this variant, because there is no return path, in the event of a fault in one of the poles the system must be reconfigured to use the transmission line of the faulty pole as a current return path before the system is able to continue to operate as a monopolar link. Thus in the event of a fault in one of the poles there will be a delay while the system is reconfigured before the system can re-commence operation.

FIG. 1 is a schematic representation of a system comprising first and second stations linked by a rigid bipolar link. The system, shown generally at 100 in FIG. 1, includes a first station 102 having first and second HVDC converters 110, 130 and a second station 104 having third and fourth HVDC converters 150, 170. The first station 102 includes or is associated with a first controller 106, which is configured to control the operation of components of the first station 102, whilst the second station 104 includes or is associated with a second controller 108, which is configured to control the operation of components of the second station 104. The first and second controllers 106, 108 are configured to communicate with each other, for example by means of a wired or wireless bidirectional telecommunications link between the first controller 106 and the second controller 108, in order to coordinate the operations required in each of the first and second stations 102, 104.

The first HVDC converter 110 is coupled to an AC transmission terminal of a first AC transmission system by a first AC breaker 112, whilst the second HVDC converter 130 is coupled to a second AC transmission terminal of the AC transmission system by a second AC breaker 132. Similarly, the third first HVDC converter 150 is coupled to an AC transmission terminal of a first AC transmission system by a third AC breaker 152, whilst the fourth HVDC converter 170 is coupled to a second AC transmission terminal of the AC transmission system by a fourth AC breaker 172.

A first live high-voltage node 114 (which is configured to be positive relative to ground) of the first HVDC converter 110 is linked to a corresponding first live high-voltage node 154 (also configured to be positive relative to ground) of the third HVDC converter 150 by a first transmission line 200, which may be, for example, an overhead, underground or sub-sea electrically conductive (e.g. metallic) cable, via first and second disconnectors 116, 118 of the first station and first and second disconnectors 156, 158 of the second station 104. The combination of the first HVDC converter 110, third HVDC converter 150, first transmission line 200 and associated disconnectors 116, 118, 156, 158 forms a first pole 240 of the system 100.

A second live high-voltage node 120 (which is configured to be negative relative to ground) of the first HVDC converter 110 is coupled in series to a first high-voltage node 134 (which is configured to be negative relative to ground) of the second HVDC converter 130 via third and fourth disconnectors 122, 136 of the first station 102. A neutral node 124 between the third and fourth disconnectors 122, 136 of the first station 102, which couples the first HVDC converter 110 to the second HVDC converter 130, is coupled to ground and to a link 126, which will be described in more detail below.

A second live high-voltage node 160 (which is configured to be negative relative to ground) of the third HVDC converter 150 is coupled in series to a first high-voltage node 174 (which is configured to be positive relative to ground) of the fourth HVDC converter 170 via third and fourth disconnectors 162, 176 of the second station 104. A neutral node 164 between the third and fourth disconnectors 162, 176 of the second station 104, which couples the first HVDC converter 110 to the second HVDC converter 130, is coupled to ground via a surge arrester 186 and to a link 166, which will be described in more detail below.

A second live high-voltage node 138 (which is configured to be negative relative to ground) of the second HVDC converter 130 is linked to a corresponding second live high-voltage node 178 (which is also configured to be negative relative to ground) of the fourth HVDC converter 170 by a second transmission line 210, which may be, for example, an overhead, underground or sub-sea electrically conductive (e.g. metallic) cable via fifth and sixth disconnectors 140, 142 of the first station and fifth and sixth disconnectors 180, 182 of the second station 104. The combination of the second HVDC converter 130, fourth HVDC converter 170, second transmission line 210 and associated disconnectors 140, 142, 180, 182 forms a second pole 250 of the system 100.

To facilitate reconfiguration of the system 100 in the event of a fault, the first station includes a link 126 between a first node intermediate the first and second disconnectors 116 and 118 of the first station 102 and a second node intermediate the fifth and sixth disconnectors 140 and 142 of the first station 102. The link 126 includes seventh and eighth disconnectors 128, 144 of the first station 102. A node intermediate the seventh and eighth disconnectors 128, 144 of the link 126 is coupled to the neutral node 124 of the first station 102 and hence to earth. The seventh and eighth disconnectors 128, 144 can be selective opened and closed to selectively couple the first or second transmission line 200, 210 to the neutral node 124 in order to reconfigure the system 100.

Similarly, the second station 104 includes a link 166 between a first node intermediate the first and second disconnectors 156 and 158 of the second station 104 and a second node intermediate the fifth and sixth disconnectors 180 and 182 of the second station 104. The link 166 includes seventh and eighth disconnectors 168, 184 of the second station 104. A node intermediate the seventh and eighth disconnectors 168, 184 of the link 166 is coupled to the neutral node 164 of the second station 104 and hence to earth via the surge arrester 186. The seventh and eighth disconnectors 168, 184 can be selective opened and closed to selectively couple the first or second transmission line 200, 210 to the neutral node 124 in order to reconfigure the system 100.

In normal operation of the system 100 the first, second, third and fourth AC breakers 112, 132, 152, 172 are closed, coupling the first, second, third and fourth HVDC converters 110, 130, 150, 170 to their respective AC transmission terminals.

The first and second disconnectors 116, 118 of the first station 102 are closed, and the first and second disconnectors 156, 158 of the second station 104 are also closed, thereby establishing a path for positive current flow between the first HVDC converter 110 and the third HVDC converter 150.

The third and fourth disconnectors 122, 136 of the first station 102 are closed, thus connecting the node 120 of the first HVDC converter 110 to the node 134 of the second HVDC converter 130, whilst the third and fourth disconnectors 162, 176 of the second station 104 are also closed, thus connecting the node 160 of the third HVDC converter 150 to the node 174 of the fourth HVDC converter 170.

The fifth and sixth disconnectors 140, 142 of the first station 102 are closed, and the fifth and sixth disconnectors 180, 182 of the second station 104 are also closed, thereby establishing a path for negative current flow between the second HVDC converter 130 and the fourth HVDC converter 170.

The seventh and eighth disconnectors 128, 144 of the first station 102 are open, and the seventh and eighth disconnectors 168, 184 of the second station 104 are also open.

If a single phase fault to ground develops in one of the HVDC converters 110, 130, 150, 170 during operation of the system 100, the first and second controllers 106, 108 issue appropriate commands to the components of the first and second stations 102, 104 to effect a number of actions, which will be described below with reference to FIG. 2, which is a schematic representation of the system 100 of FIG. 1 following detection of a fault to ground in the third HVDC converter 150.

Following detection of the fault (which in this example is a fault to ground in the third HVDC converter 150), the first, second, third and fourth AC breakers 112, 132, 152, 172 are opened, in response to commands issued by the first and second controllers 106, 108, to isolate the first, second, third and fourth HVDC converters 110, 130, 150, 170 from their respective AC transmission terminals.

With the first, second, third and fourth HVDC converters 110, 130, 150, 170 isolated in this way, the faulted pole containing the faulted HVDC converter (in this example the first pole 240) is isolated from the healthy pole (in this example the second pole 250) and from the transmission line of the faulted pole (in this example the first transmission line 200), by opening the first and third disconnectors 116, 122 of the first station 102 and opening the second and third disconnectors 158, 162 of the second station, in response to commands issued by the first and second controllers 106, 108.

Once the faulted pole has been isolated from the healthy pole and from the transmission line of the faulted pole, the system 100 can be reconfigured to operate in a monopolar link configuration in which the transmission line of the faulted pole is used as a return path for the healthy pole. In the present example this is achieved by closing the seventh disconnector 128 of the link 126 of the first station 102 and closing the seventh disconnector 168 of the link 166 of the second station 104, in response to commands issued by the first and second controllers 106, 108 to couple the first transmission line 210 to the neutral nodes 124, 166 of the first and second stations 102, 104.

The second, fourth, fifth and sixth disconnectors 118, 136, 140, 142 of the first station 102 and the first, fourth, fifth and sixth disconnectors 156, 176, 180, 182 of the second station 104 remain closed. The transmission line 210 of the (faulted) first pole 240 can therefore be used as a current return path for the (healthy) second pole 250.

Once the system 100 has been reconfigured in this way, the second and fourth AC breakers 132, 172 can be closed, in response to commands issued by the first and second controllers 106, 108, to re-couple the second and fourth HVDC converters 130, 170 to their respective AC transmission terminals, allowing current to flow in the system 100 in the direction indicated by the arrows in FIG. 2.

As will be appreciated, due to the large number of AC breakers and disconnectors involved, the process of isolating the faulted pole and reconfiguring the system 100 described above can take a significant amount of time (of the order of 20-30 seconds) to complete. This delay may be unacceptable in some applications in which reconfiguration must be completed rapidly (e.g. in around 2 seconds).

One way to reduce the time taken for the reconfiguration process described above is to replace the first, second, third, fourth, fifth and sixth disconnectors 116, 118, 122, 136, 140, 142 of the first station 102 and the first, second, third, fourth, fifth and sixth disconnectors 156, 158, 162, 176, 180, 182 of the second station 104 with high-speed switches or breakers. Such high-speed switches or breakers must be designed to be capable of opening and closing rapidly, and must be capable of withstanding DC voltage/current stresses. However, switches or breakers that meet these requirements tend to be costly, and so replacing the many disconnectors of the system 100 with such switches or breakers involves significant cost.

Accordingly, a desire exists for a cost effective HVDC transmission system that can be reconfigured rapidly in the event of a fault.

SUMMARY

According to a first aspect, the invention provides a high voltage direct current (HVDC) transmission system comprising: a first station comprising series-connected first and second HVDC converters; a second station comprising series-connected third and fourth HVDC converters, wherein a neutral node coupling the third HVDC converter to the fourth HVDC converter is coupled to earth; a first transmission line connecting a positive node of the first HVDC converter to a corresponding positive node of the third HVDC converter, wherein a first pole of the system comprises the first HVDC converter, the third HVDC converter and the first transmission line; a second transmission line connecting a negative node of the second HVDC converter to a corresponding negative node of the fourth HVDC converter, wherein a second pole of the system comprises the second HVDC converter, the fourth HVDC converter and the second transmission line; characterised in that: a neutral node connecting the first HVDC converter to the second HVDC converter is coupled to a parallel combination of a resistance and a neutral bus ground switch for coupling the neutral node to earth.

The HVDC transmission system of the present invention provides a bipolar HVDC transmission scheme that is rapidly reconfigurable in the event of a fault in one of its HVDC converters to a monopole scheme which uses the transmission line of the pole in which a fault has occurred as a return path.

The first station may comprise a first link coupled at a first end to the first transmission line and coupled at a second end to the second transmission line, the first link comprising series-connected first and second high-speed switches. A third node connecting the first and second high-speed switches may be coupled to the neutral node of the first station, and the first and second high-speed switches may be selectively operable to couple either the first transmission line or the second transmission line to the neutral node of the first station. The second station may comprise a second link coupled at a first end to the first transmission line and coupled at a second end to the second transmission line, the second link comprising third and fourth high-speed switches. A fourth node connecting the third and fourth high-speed switches may be coupled to the neutral node of the second station, and the second and third high-speed switches may be selectively operable to couple either the first transmission line or the second transmission line to the neutral node of the second station.

The neutral node of the second station may be coupled a surge arrestor for coupling the neutral node to earth.

The first, second, third and fourth HVDC converters may comprise line commutated converters.

Alternatively, the first, second, third and fourth HVDC converters may comprise voltage source converters.

The HVDC transmission system may further comprise a dedicated metallic return coupling the neutral node of the first station to the neutral node of the second station.

According to a second aspect of the invention there is provided a HVDC converter station comprising: series-connected first and second HVDC converters, the first HVDC converter comprising a positive node configured to be coupled to a first transmission line, the second HVDC converter comprising a negative node configured to be coupled to a second transmission line, characterised in that: a neutral node connecting the first HVDC converter to the second HVDC converter is coupled to a parallel combination of a resistance and a neutral bus ground switch for coupling the neutral node to earth.

The HVDC converter station may further comprise: a link configured to be coupled at a first end to the first transmission line and configured to be coupled at a second end to the second transmission line, the first link comprising series-connected first and second high-speed switches, wherein a node connecting the first and second high-speed switches is coupled to the neutral node, and wherein the first and second high-speed switches are selectively operable to couple either the first transmission line or the second transmission line to the neutral node of the first station.

The first and second HVDC converters may comprise line commutated converters.

Alternatively, the first and second HVDC converters may comprise voltage source converters.

According to a third aspect of the invention there is provided a method for reconfiguring the system of the first aspect on detection of a fault to ground in one of the first, second, third or fourth HVDC converters, the method comprising: detecting the fault; isolating at least the HVDC converters of the faulted pole containing the HVDC converter in which the fault occurred from respective AC transmission terminals; opening the neutral bus ground switch so as to cause leakage current in the system to flow through the resistance; coupling the transmission line of the faulted pole to the neutral of the first and second stations, such that the coupled transmission line provides a return path for current in the healthy pole in which the fault did not occur; and isolating the HVDC converters of the faulted pole from the HVDC converters of the healthy pole and from the coupled transmission line.

The method may further comprise: after isolating the HVDC converters of the faulted pole from the HVDC converters of the healthy pole and from the coupled transmission line.

According to a fourth aspect of the invention, there is provided a method for reconfiguring the system of the second aspect on detection of a fault to ground in one of the first, second, third or fourth HVDC converters, the method comprising: detecting the fault; isolating the HVDC converters of the faulted pole containing the HVDC converter in which the fault occurred from respective AC transmission terminals; and opening the neutral bus ground switch so as to cause leakage current in the system to flow through the resistance.

The method according may further comprise: coupling the transmission line of the faulted pole to the neutral nodes (124, 164) of the first and second stations, such that the coupled transmission line provides a return path for current in the healthy pole; and isolating the HVDC converter in which the fault occurred from the HVDC converters of the healthy pole and from the coupled transmission line.

The method may further comprise: closing the neutral bus ground switch.

BRIEF DESCRIPTION OF THE DRAWINGS

Embodiments of the invention will now be described, strictly by way of example only, with reference to the accompanying drawings, of which:

FIG. 5 is a flow diagram illustrating steps in a method for reconfiguring the HVDC transmission system of FIG. 3;

FIGS. 7a-7d are schematic representations of the HVDC transmission system of FIG. 5 following detection of a fault.

DETAILED DESCRIPTION

Figure 3:
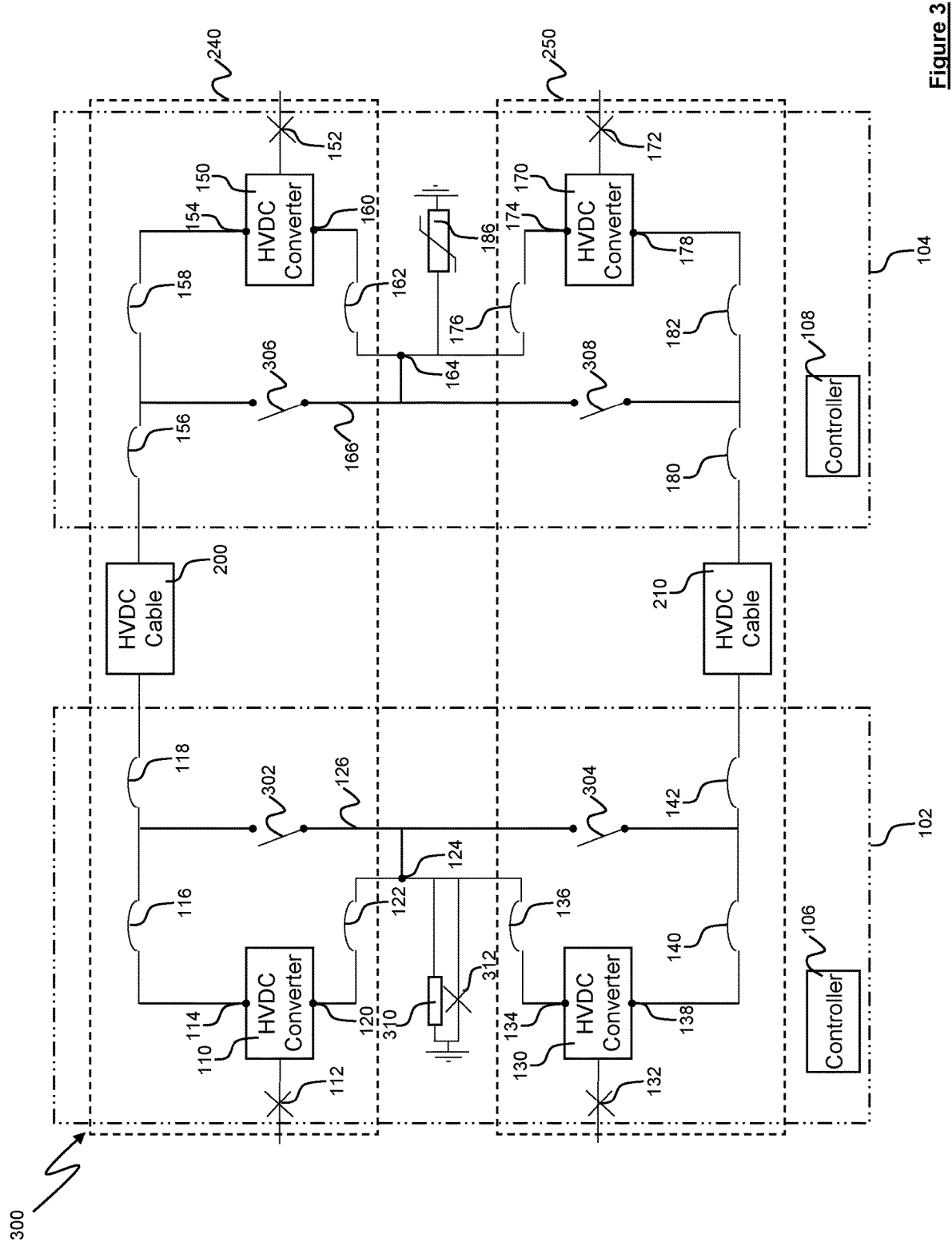
FIG. 3 is a schematic representation of an alternative bipolar link HVDC transmission system.

Referring now to FIG. 3, a HVDC transmission system is shown generally at 300. The system 300 shares many common elements with the system 100 described above and illustrated in FIG. 1, so common reference numerals have been used to denote common elements of the systems 100 and 300. For the sake of clarity and brevity only those features of the system 300 that differ from the system 100 will be described here.

Figure 1:
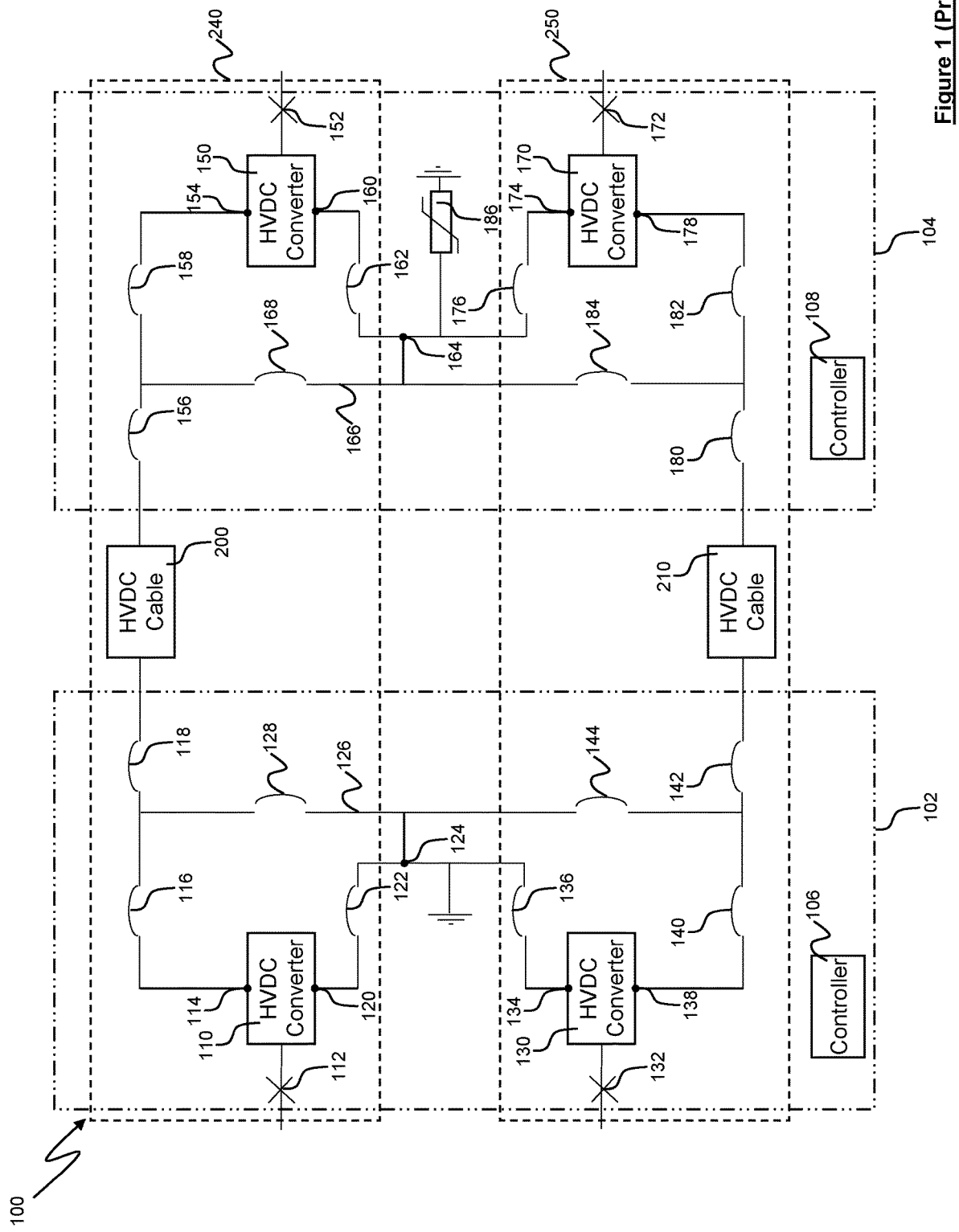
FIG. 1 is a schematic representation of a bipolar link HVDC transmission system.
Figure 2:
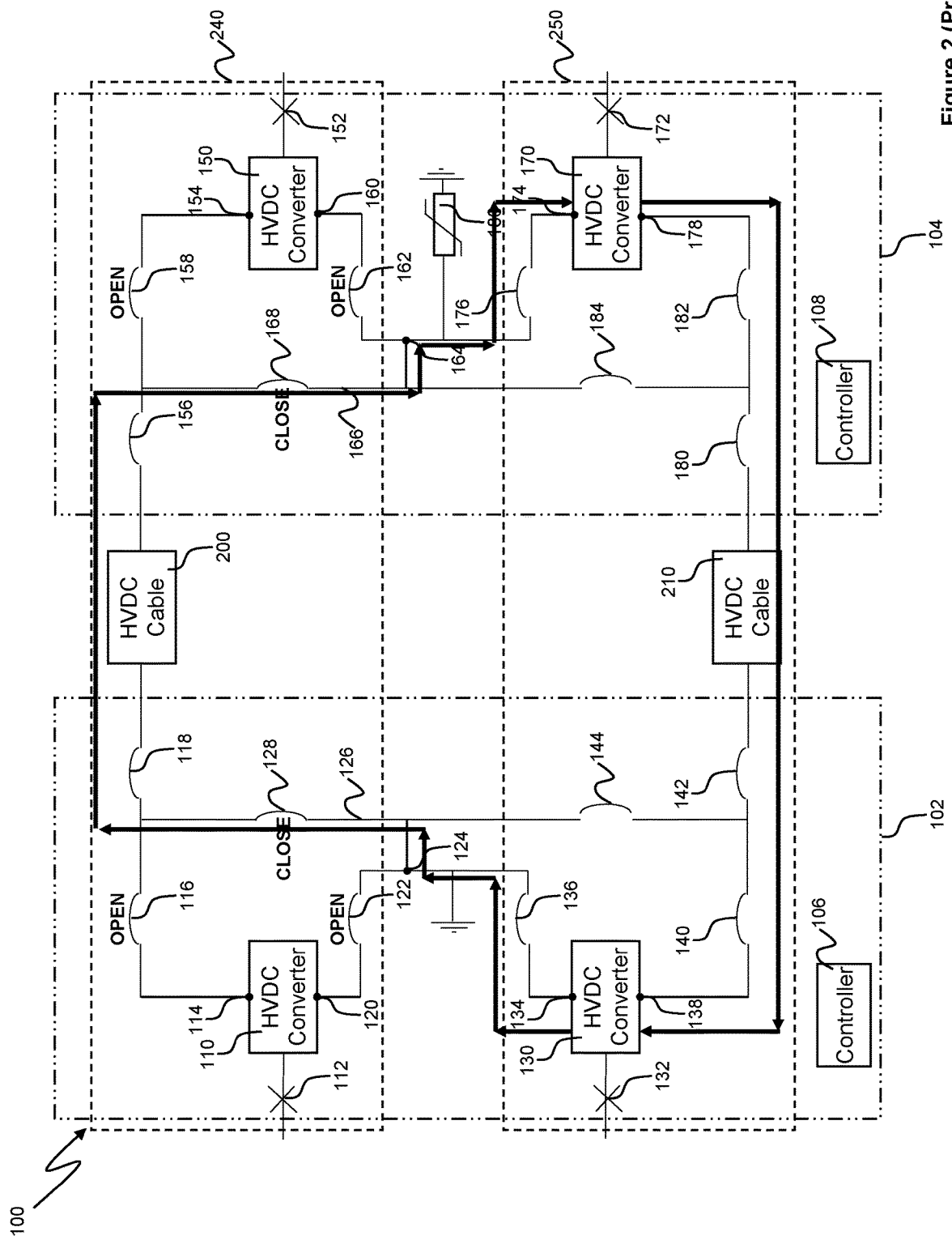
FIG. 2 is a schematic representation of the HVDC transmission system of FIG. 1 after reconfiguration to act as a monopolar link HVDC transmission system.

The system 300 is similar to the system 100, with the exception that the link 126 of the first station 102 includes first and second high-speed switches 302, 304 in place of the seventh and eighth disconnectors 128, 144 of the first station 102 of the system of FIG. 1. Similarly, the link 166 of the second station 104 includes third and fourth high-speed switches 306, 308 in place of the seventh and eighth disconnectors 168, 184 of the second station 104 of the system of FIG. 1. The high-speed switches 302, 304 can be selective opened and closed to selectively couple the first or second transmission line 200, 210 to the neutral node 124 of the first station 102 in order to reconfigure the system 300, whilst the high-speed switches 306, 308 can be selective opened and closed to selectively couple the first or second transmission line 200, 210 to the neutral node 164 of the second station 104 in order to reconfigure the system 300.

Additionally, the first station 102 includes a resistor 310 of high resistance (of the order of 50-1000Ω, for example) and a neutral bus ground switch (NBGS) 312 connected in parallel between its neutral node 124 and earth. The resistor 310 provides a first, high resistance, path to earth, whilst the NBGS 312, when closed, provides a second, much lower resistance, path to earth than the resistor 310, such that when the NBGS 312 is closed the first path is ineffective. In normal operation of the system 300 the NBGS 312 is closed.

In normal operation the system 300 operates in the same manner as the system 100 described above, with the exception that the first and second high speed switches 302, 304 of the link 126 of the first station 102 (which replace the seventh and eighth disconnectors 128, 144 of the link 126 of the first station 102 of the system 100 of FIG. 1) are open, and the third and fourth high speed switches 306, 308 of the link 166 of the second station 104 (which replace the seventh and eighth disconnectors 168, 184 of the link 166 of the second station 104 of the system 100 of FIG. 1) are also open.

As indicated above, the NBGS 312 is closed in normal operation of the system.

If a single phase fault to ground develops in one of the HVDC converters 110, 130, 150, 170 during operation of the system 300, a number of actions are taken, as will be described below with reference to FIGS. 4a-4d, which are schematic representations of the system 300 of FIG. 3 following detection of a fault to ground in the third HVDC converter 150. It will be appreciated of course that the system 300 operates in the same way if a fault is detected in any of the other HVDC converters 110, 130, 170.

As in the system 100 of FIG. 1, following detection of the fault in the third HVDC converter 150, the first, second, third and fourth AC breakers 112, 132, 152, 172 are opened, in response to commands issued by the first and second controllers 106, 108, to isolate the first, second, third and fourth HVDC converters 110, 130, 150, 170 from their respective AC transmission terminals.

Alternatively, instead of opening all of the AC breakers 112, 132, 152, 172, only the AC breakers related to the faulted pole (in this case the first and third AC breakers 112, 152 of the first pole 240) are opened. The AC breakers related to the healthy pole (in this case the second and fourth AC breakers 132, 172 of the second pole 250) remain closed but the DC power in the healthy pole is ramped down to minimise the DC current flowing in the healthy pole.

With the relevant ones of the first, second, third and fourth HVDC converters 110, 130, 150, 170 isolated in this way stored energy circulates in the system 300. Because of the fault to ground in the third HVDC converter 150, leakage current flows through the earth, second low resistance path provided by the closed NBGS 312, fourth disconnector 122, first HVDC converter 110, first and second disconnectors 116, 118 of first station 102, first transmission line 200, and first and second disconnectors 156, 158 of second station 104, as shown by the dashed arrow in FIG. 4a.

Figure 4A:
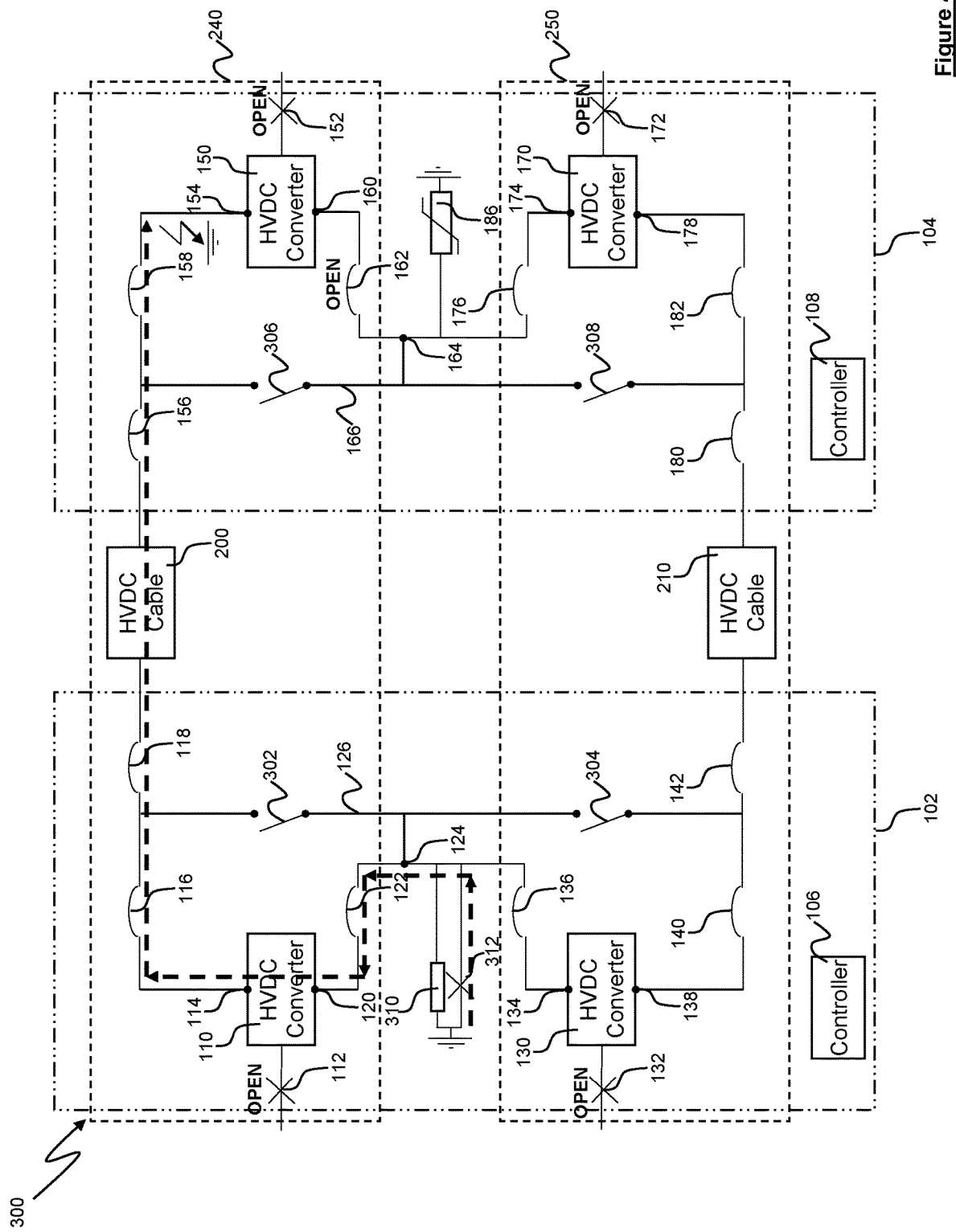
FIGS. 4a-4d are schematic representations of the HVDC transmission system of FIG. 3 following detection of a fault.
Figure 4B:
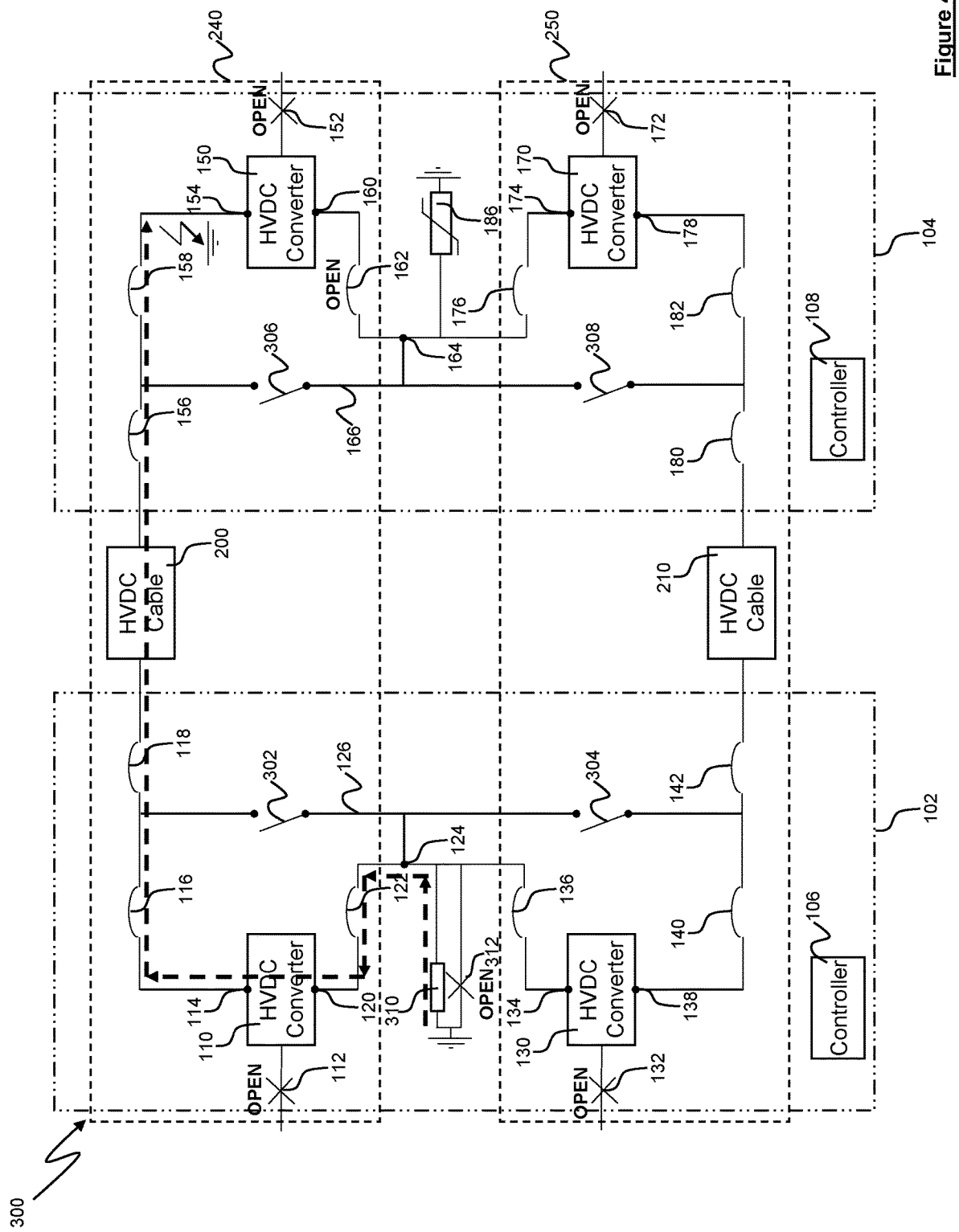

After the relevant ones of the first, second, third and fourth AC breakers 112, 132, 152, 172 have been opened to isolate the relevant ones of the first, second, third and fourth HVDC converters 110, 130, 150, 170 from their respective AC transmission terminals, the NBGS 312 is opened in response to a command issued by the first controller 106, effectively activating the first, high resistance, path to earth containing the resistor 310, as shown in FIG. 4b.

The system 300 is then reconfigured to operate in a monopolar link configuration, by closing the first high-speed switch 302 of the link 126 of the first station 102 and closing the third high-speed switch 306 of the link 166 of the second station 104 in response to commands issued by the first and second controllers 106, 108, so as to couple the first transmission line 200 to the neutral nodes 124, 164 of the first and second stations 102, 104.

Figure 4C:
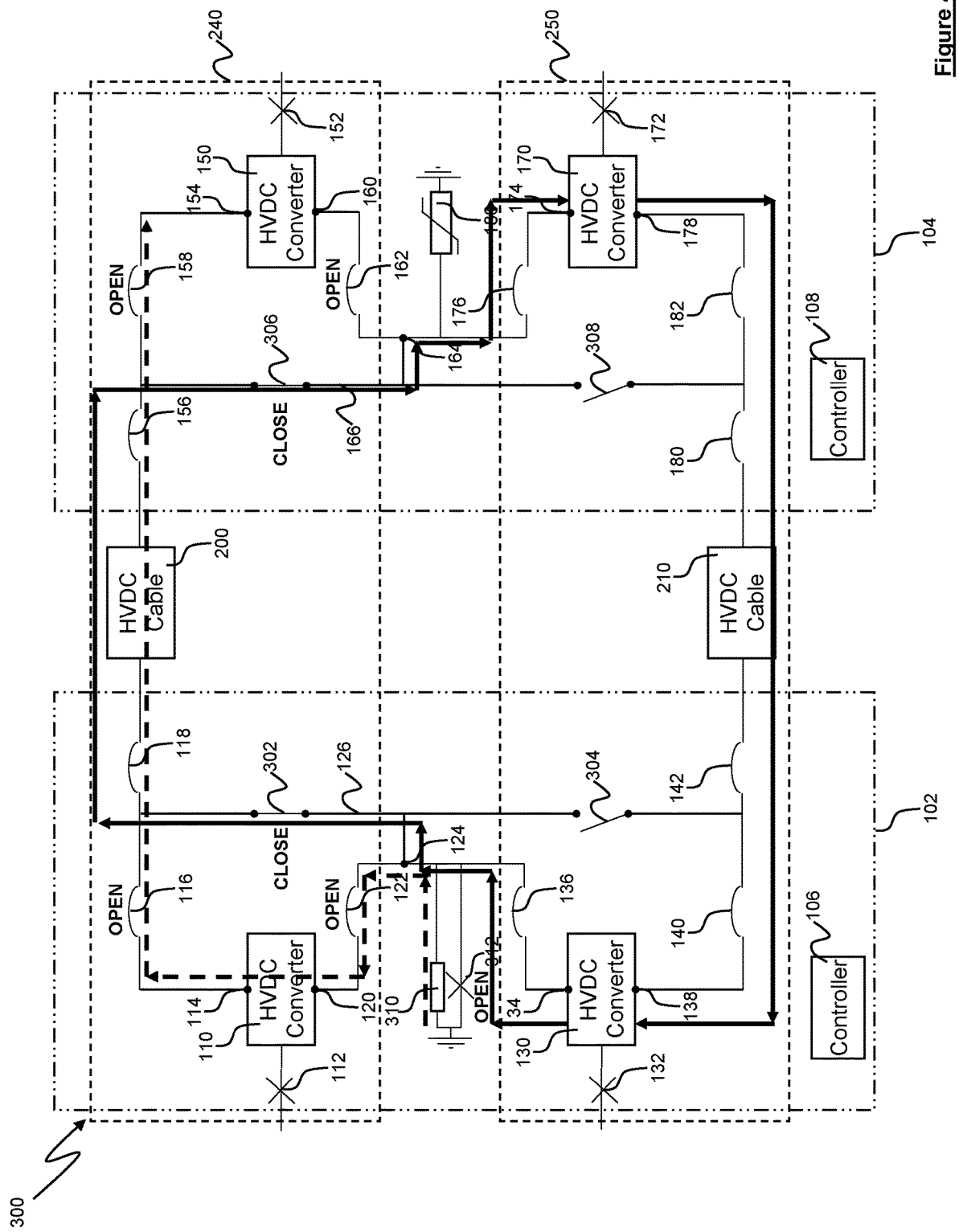

The second, fourth, fifth and sixth disconnectors 118, 136, 140, 142 of the first station 102 and the first, fourth, fifth and sixth disconnectors 156, 176, 180, 182 of the second station 104 remain closed, such that the first transmission line 200 can be used as a current return path for the second pole 250, as shown in FIG. 4c.

Once the system 100 has been reconfigured in this way, the second and fourth AC breakers 132, 172 are closed (if they had previously been opened), or the DC power in the healthy pole is ramped up again (if it had previously been ramped down), in response to commands issued by the first and second controllers 106, 108 to re-couple the second and fourth HVDC converters 130, 170 to their respective AC transmission terminals if necessary, and allow current to flow in the system 100 in the direction indicated by the solid arrows in FIG. 4c, with the first transmission line 200 being used as a current return path.

Leakage current arising due to the fault is now able to flow through the earth, first high resistance path provided by resistor 310, fourth disconnector 122, first HVDC converter 110, first and second disconnectors 116, 118 of first station 102, first transmission line 200, and first and second disconnectors 156, 158 of second station 104, as shown by the dashed arrow in FIG. 4c. However, due to the high resistance of the resistor 310 the leakage current that flows is very small.

Figure 4D:
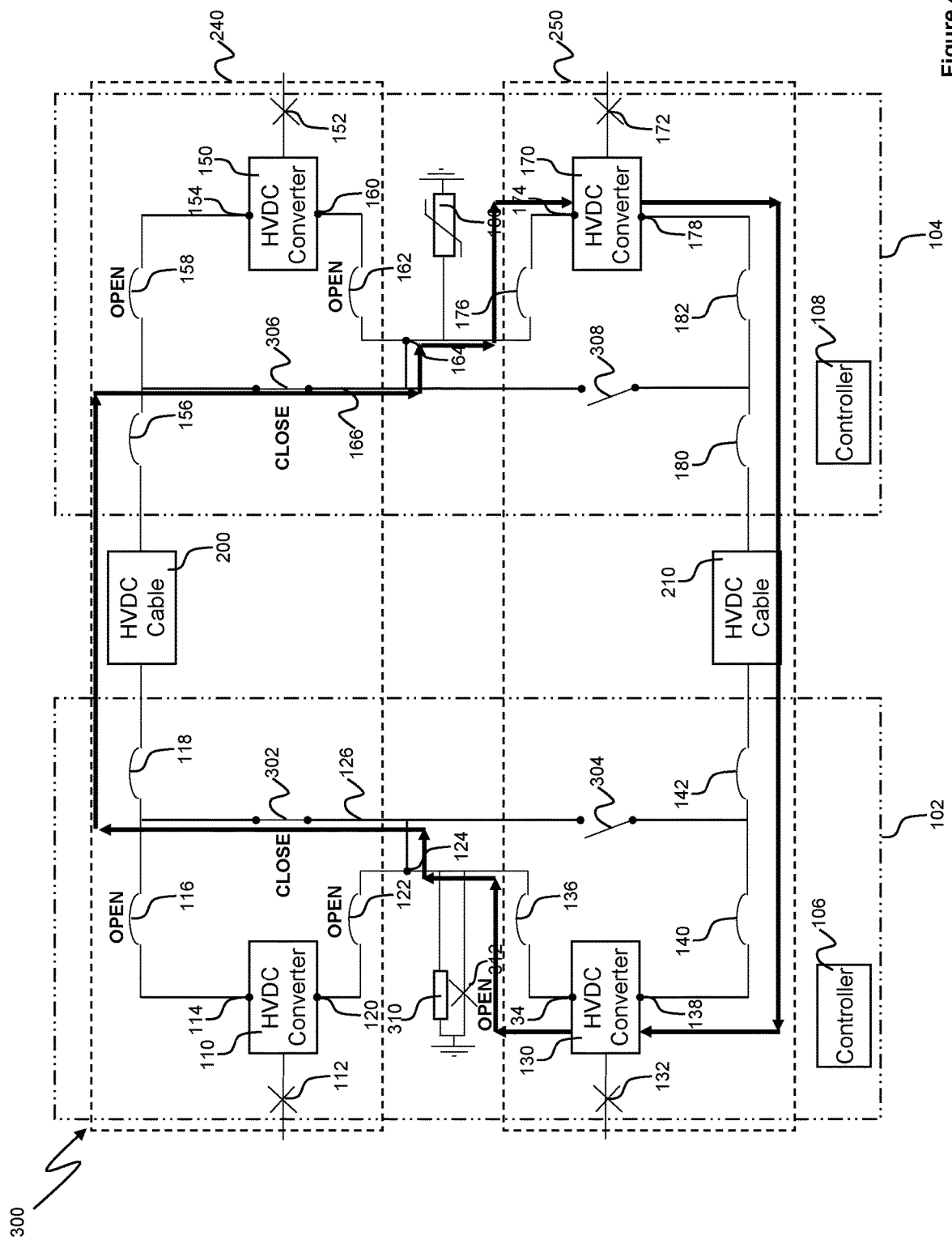

Because the leakage current flowing in the first disconnector 116 and third disconnector 122 of first station 102 and in the second disconnector 158 and third disconnector 162 of the second station 104 is very small once the NBGS 312 has been opened, the second disconnector 158 can now be opened, as shown in FIG. 4d, in response to a command issued by the second controller 108, to isolate the faulted third HVDC converter 150 from the first transmission line 200. The third disconnector 162 of the second station is also opened in response to a command issued by the second controller 108, to isolate the faulted third HVDC converter 150 from the fourth HVDC converter 170. The first and third disconnectors 116, 122 of the first station 102 are also opened, in response to a command issued by the first controller 106, to isolate the first HVDC converter 110 from the first transmission line 200 and the second HVDC converter 130. With the second and third disconnectors 158, 162 of the second station 104 and the first and third disconnectors 116, 122 open, no leakage current flows and the NBGS 312 can revert to its normal closed state, in response to a command issued by the first controller 106.

In the system 300 the healthy pole (the second pole 250 in the example described above) is available for use in the monopole configuration of FIG. 4b very quickly after detection of a fault. This is because fewer disconnectors are required to be opened before the healthy pole 250 is available for use, since leakage current in the system 300 is greatly reduced by the resistor 310 and thus can safely be handled by the second disconnector 158 of the second station 104 after the system 300 has been reconfigured to operate in the monopole configuration, meaning that the first disconnector 116 and third disconnector 122 of first station 102 and the second disconnector 158 and third disconnector 162 of the second station 104 can be opened even while the healthy pole 250 is conducting. Thus the process of bringing the healthy pole back into service is not unduly limited by the time required to open the first disconnector 116 and third disconnector 122 of first station 102 and the second disconnector 158 and third disconnector 162 of the second station 104, since the healthy pole can be brought back into service while the first disconnector 116 and third disconnector 122 of first station 102 and the second disconnector 158 and third disconnector 162 of the second station 104 are closed, with the second disconnector 158 subsequently being opened. Further, the use of the high speed switches 302, 306 in the transfer buses 126, 166 facilitates the rapid reconfiguration of the system 300 into the monopole configuration.

FIG. 5 is a flow diagram illustrating steps of a method 500 performed by the first and second controllers 106, 108 in order to reconfigure the system 300 to operate in a monopole configuration.

In a first step 502, a fault to ground is detected in one of the HVDC converters 110, 130, 150, 170 of the system 300 by either the first controller 106 or the second controller 108. In the example discussed above the fault occurs in the third HVDC converter 150, which is part of the second station 104 and thus may be detected by the second controller 108. It will be appreciated that corresponding steps will be performed using the appropriate AC breakers, disconnectors and high-speed switches of the system 300 in the event that a fault is detected in one of the other HVDC converters 110, 130, 170.

At step 504, the first and second controllers 106, 108 issue commands to the first, second, third and fourth AC breakers 112, 132, 152, 172 to cause them to open. Alternatively, the first and second controllers 106, 108 may issue commands to only the AC breakers related to the faulted pole (in this case the first and third AC breakers 112, 152 of the first pole 240) to cause them to open, whilst issuing commands to the HVDC converters 130, 170 of the healthy pole to ramp down their DC power to minimise the DC current flowing in the healthy pole.

At step 506, the first controller 106 issues a command to the NBGS 312 to cause it to open.

At step 508, the first and second controllers 106, 108 issue control signals to the first high-speed switch 302 of the link 126 of the first station 102 and the third high-speed switch 306 of the link 166 of the second station 104 to cause those switches to close, thus reconfiguring the system 300 to operate in a monopolar link configuration using the first transmission line 200 as a current return path as described above.

At step 510 the first and second controllers 106, 108 issue commands to the second and fourth AC breakers 132, 172 to cause them to close, thereby re-coupling the second and fourth HVDC converters 130, 170 to their respective AC transmission terminals. Alternatively, if the second and fourth AC breakers were not opened, but instead the DC power in the healthy pole was ramped down following detection of the fault, the first and second controllers 106, 108 may issue commands to the HVDC converters 130, 170 of the healthy pole to ramp up their DC power, thereby increasing current flow in the healthy pole.

At step 512, the second controller 108 issues control signals to the second and third disconnectors 158, 162 of the second station 104 to cause the second and third disconnectors 158, 162 to open, thereby isolating the third HVDC converter 150 from the first transmission line 200 and from the fourth HVDC converter 170. The first controller 106 also issues control signals to the first and third disconnectors 116, 122 of the first station 102 to cause the first and third disconnectors 116, 122 to open, thereby isolating the first HVDC controller 110 from the first transmission line 200 and from the second HVDC converter 130.

At step 510, the first controller 106 issues a command to the NBGS 312 to cause it to close.

The principles discussed above are also applicable to bipolar configurations with a dedicated metallic return (DMR), as will now be explained with referent to FIGS. 6-8.

Figure 6:
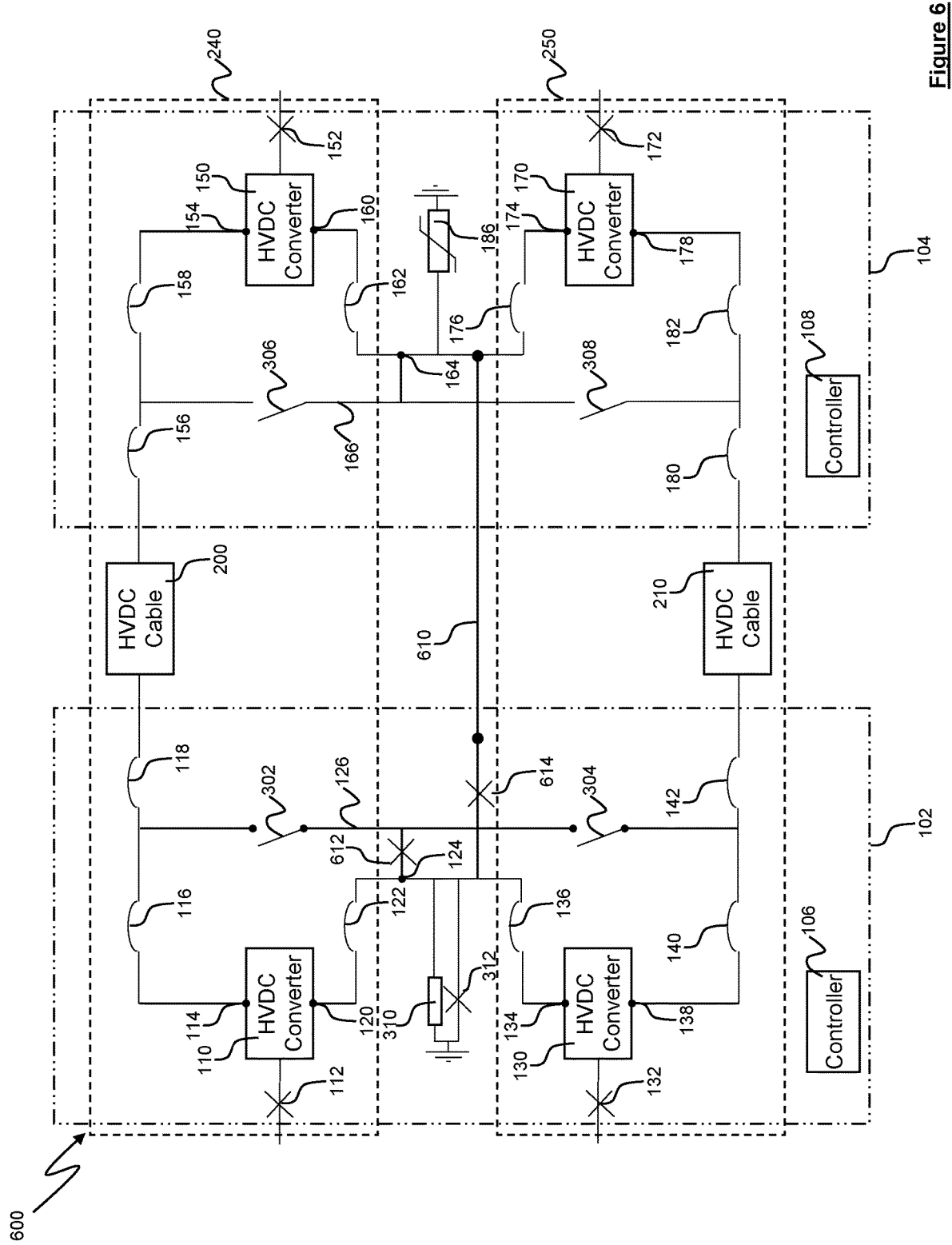
FIG. 6 is a schematic representation of a bipolar link HVDC transmission system with a dedicated metallic return (DMR)

Referring now to FIG. 6, a bipolar link HVDC transmission system with a dedicated metallic return is shown generally at 600. The system 600 shares many common elements with the system 300 described above and illustrated in FIG. 3, so common reference numerals have been used to denote common elements of the systems 300 and 600. For the sake of clarity and brevity only those features of the system 600 that differ from the system 600 will be described here.

The system 600 is similar to the system 300, with the exception that the system 600 includes a dedicated metallic return (DMR) 610 which is operative to couple the neutral node 124 of the first station 102 to the corresponding neutral node 164 of the second station. The DMR 610 may be, for example, an overhead, underground or sub-sea transmission line of a conductive metallic material.

A DMR transfer breaker (DMRTB) 612 is provided between the neutral node 124 and the link 126 of the first station 102, whilst a metallic return transfer breaker (MRTB) 614 is provided between a second end of the DMR 610 and the neutral node 124 of the first station 102. In normal operation of the system 600 (prior to any fault in the system 600) the DMRTB 612 is closed and the MRTB 614 is open.

In normal operation the system 600 operates in the same manner as the system 300 described above.

If a single phase fault to ground develops in one of the HVDC converters 110, 130, 150, 170 during operation of the system 600, a number of actions are taken, as will be described below with reference to FIGS. 7a-7d, which are schematic representations of the system 600 of FIG. 6 following detection of a fault to ground in the third HVDC converter 150. It will be appreciated of course that the system 600 operates in the same way if a fault is detected in any of the other HVDC converters 110, 130, 170.

Following detection of the fault in the third HVDC converter 150, the first and third AC breakers 112, 152 are opened, in response to commands issued by the first and second controllers 106, 108, to isolate the first and third HVDC converters 110, 130 from their respective AC transmission terminals, thereby disabling the first pole 240, in which the fault occurred. Unlike in the system 300 of FIG. 3, the second and fourth AC breakers 132, 172 are not opened, but instead remain closed, permitting the healthy second pole 250 to continue to operate, with return current flowing in the DMR 510, as indicated by the solid arrow in FIG. 7a.

With the first and third HVDC converters 110, 150 isolated in this way stored energy circulates in the system 600. Because of the fault to ground in the third HVDC converter 150, leakage current flows through the earth, second low resistance path provided by the closed NBGS 312, fourth disconnector 122, first HVDC converter 110, first and second disconnectors 116, 118 of first station 102, first transmission line 200, and first and second disconnectors 156, 158 of second station 104, as shown by the dashed arrow in FIG. 7a.

Figure 7B:
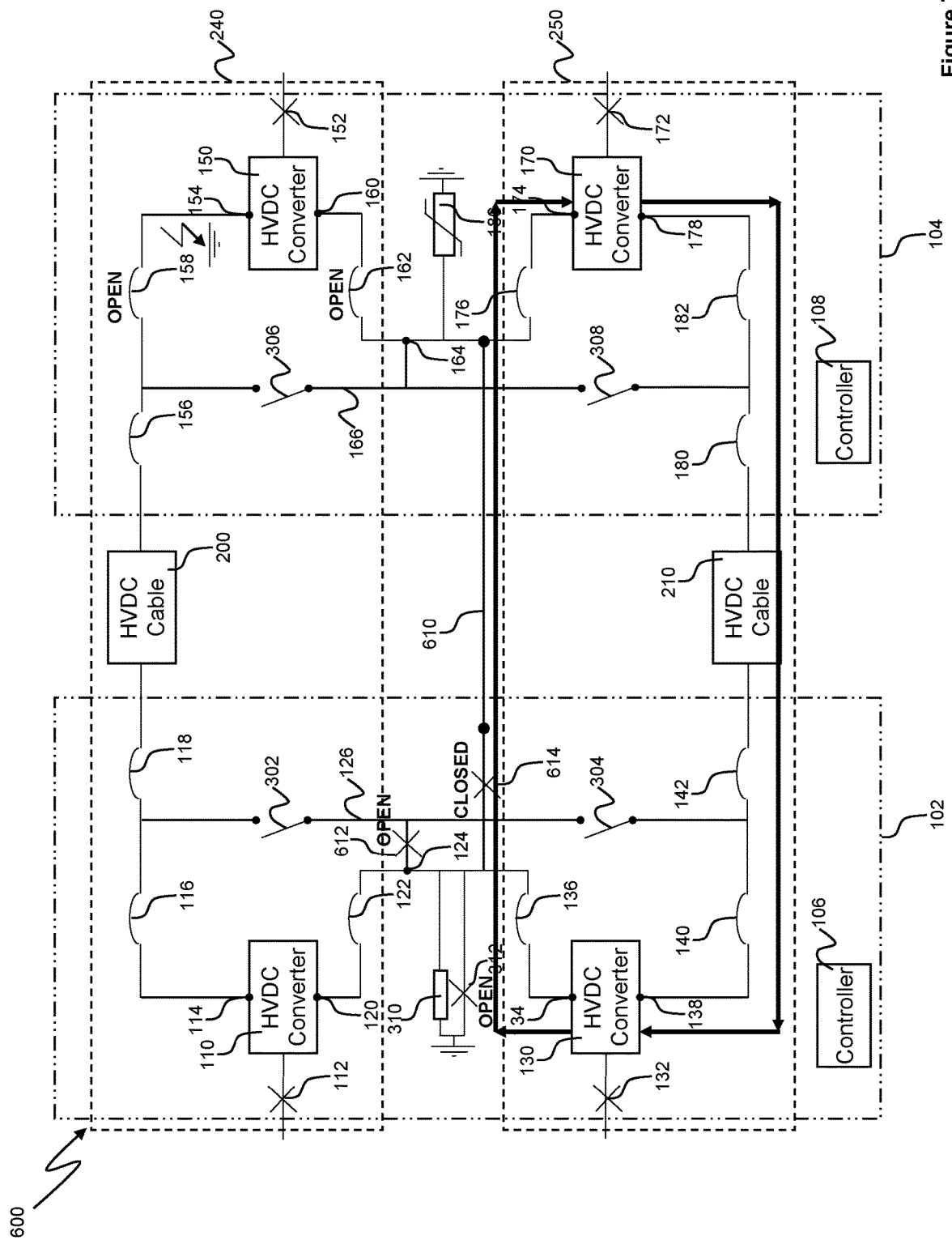

The healthy pole 250 may now be reconfigured to operate as a monopole with metallic return, using the DMR 610 as a return path as shown in FIG. 7b. Thus the first controller 106 may issue control signals to the MRTB 614 and the DMRTB 612 to cause the MRTB 614 to close and subsequently to cause the DMRTB 612 to open, thus enabling the DMR 610 to provide a dedicated current return path between the first and second stations 102, 104.

After the first and third AC breakers 112, 152, have been opened to isolate the first and third HVDC converters 110, 150 from their respective AC transmission terminals, the NBGS 312 is opened in response to a command issued by the first controller 106, effectively activating the first, high resistance, path to earth containing the resistor 310.

The system 600 can now be reconfigured, if necessary, to use the first transmission line 200 as a current return path. In order to reconfigure the system 600 in this way, the first and second controllers 106, 108 issue commands to cause the first high-speed switch 302 of the link 126 of the first station 102 and the third high-speed switch 306 of the link 166 of the second station 104 to close. Additionally, the first controller 106 issues commands to the MRTB 614 to cause it to open, thereby isolating the DMR 610 from the first station 102 so that it can no longer act as a current return path. The first controller 106 then issue a command to the DMRTB 612 to cause the DMRTB 612 to close.

Figure 7C:
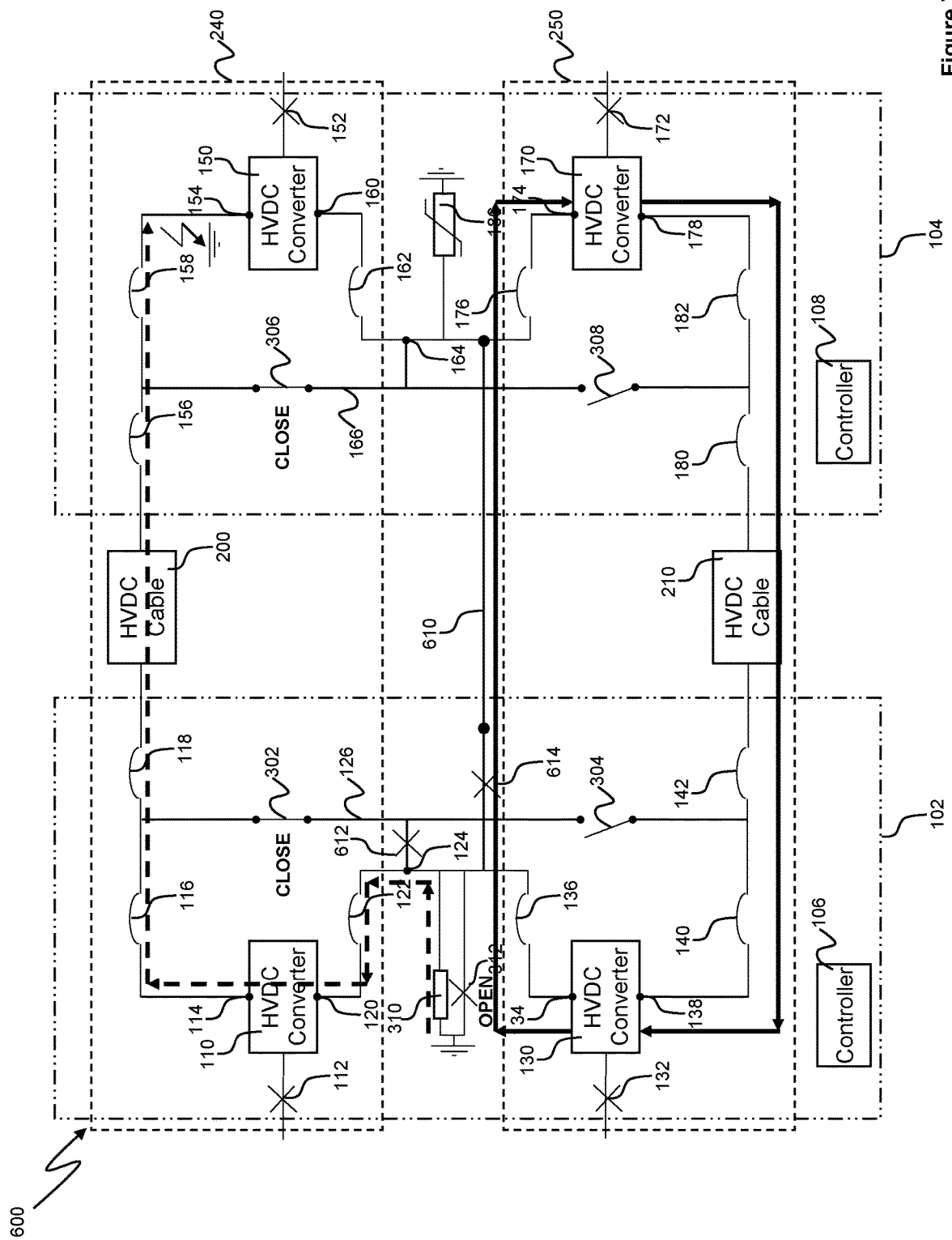
Figure 7D:
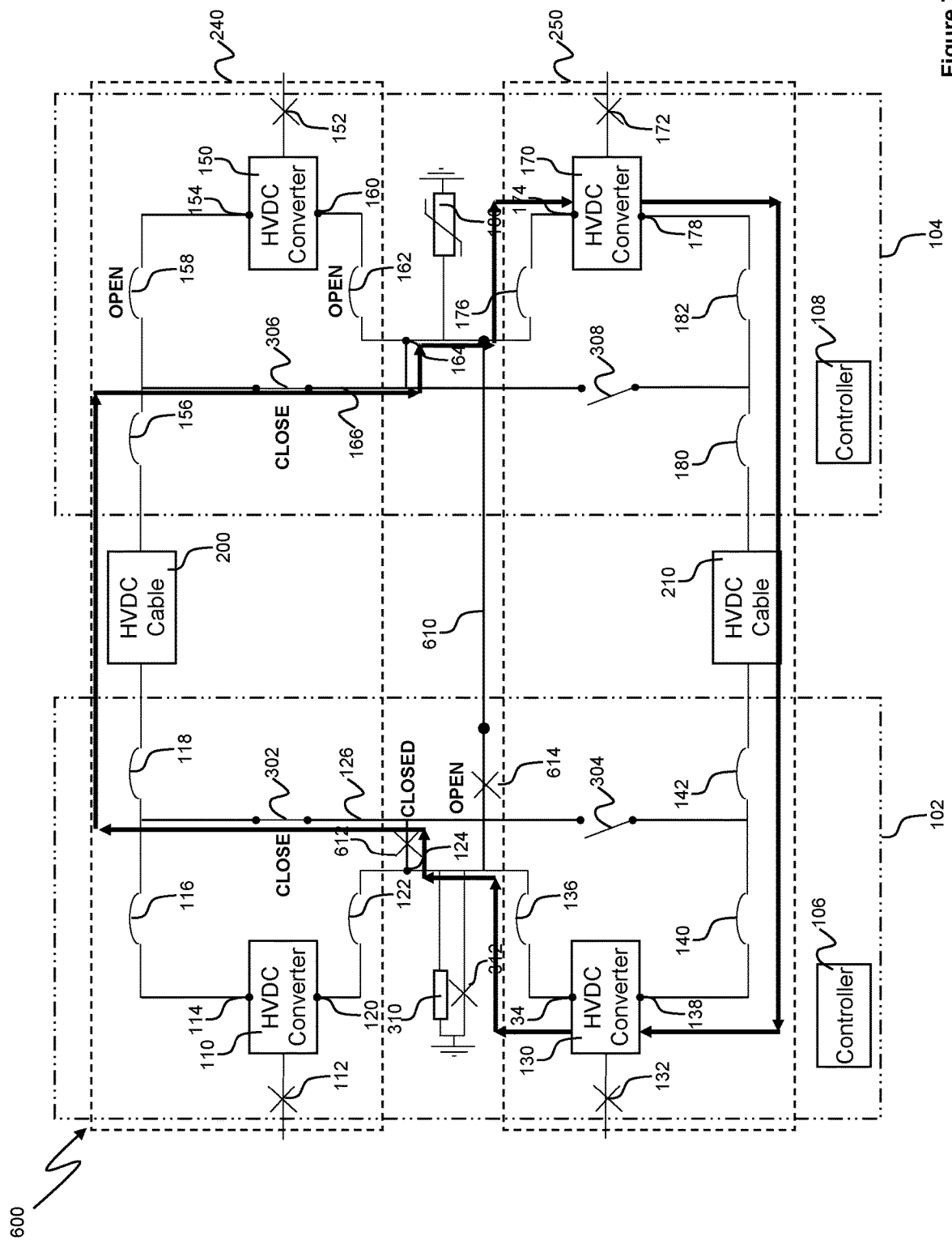

The second, fourth, fifth and sixth disconnectors 118, 136, 140, 142 of the first station 102 and the first, fourth, fifth and sixth disconnectors 156, 176, 180, 182 of the second station 104 remain closed, such that the first transmission line 200 can be used as a current return path for the second pole 250, as indicated by the arrow in FIG. 7d. The system 600 thus operates in a monopolar link configuration.

Leakage current is now able to flow through the earth, first high resistance path provided by resistor 310, fourth disconnector 122, first HVDC converter 110, first and second disconnectors 116, 118 of first station 102, first transmission line 200, and first and second disconnectors 156, 158 of second station 104, as shown by the dashed arrow in FIG. 7c. However, due to the high resistance of the resistor 310 the leakage current that flows is very small.

Because the leakage current flowing in the first disconnector 116 and third disconnector 122 of the first station 102 and in the second disconnector 158 and third disconnector 162 of the second station 104 is very small once the NBGS 312 has been opened, the second disconnector 158 of the second station 104 can now be opened, in response to a command issued by the second controller 108, to isolate the faulted third HVDC converter 150 from the first transmission line 200. The third disconnector 162 of the second station is also opened in response to a command issued by the second controller 108 to isolate the third HVDC converter 150 from the fourth HVDC converter 130. The first and third disconnectors 116, 122 of the first station 102 may also be opened, in response to a command issued by the first controller 106, to isolate the first HVDC converter 110 from the first transmission line 200 and from the second HVDC converter 130. With the second and third disconnectors 158, 162 of the second station 104 and the first and third disconnectors 116, 122 of the first station 102 open, no leakage current flows, as shown in FIG. 7d, and the NBGS 312 can revert to its normal closed state, in response to a command issued by the first controller 106.

Figure 8:
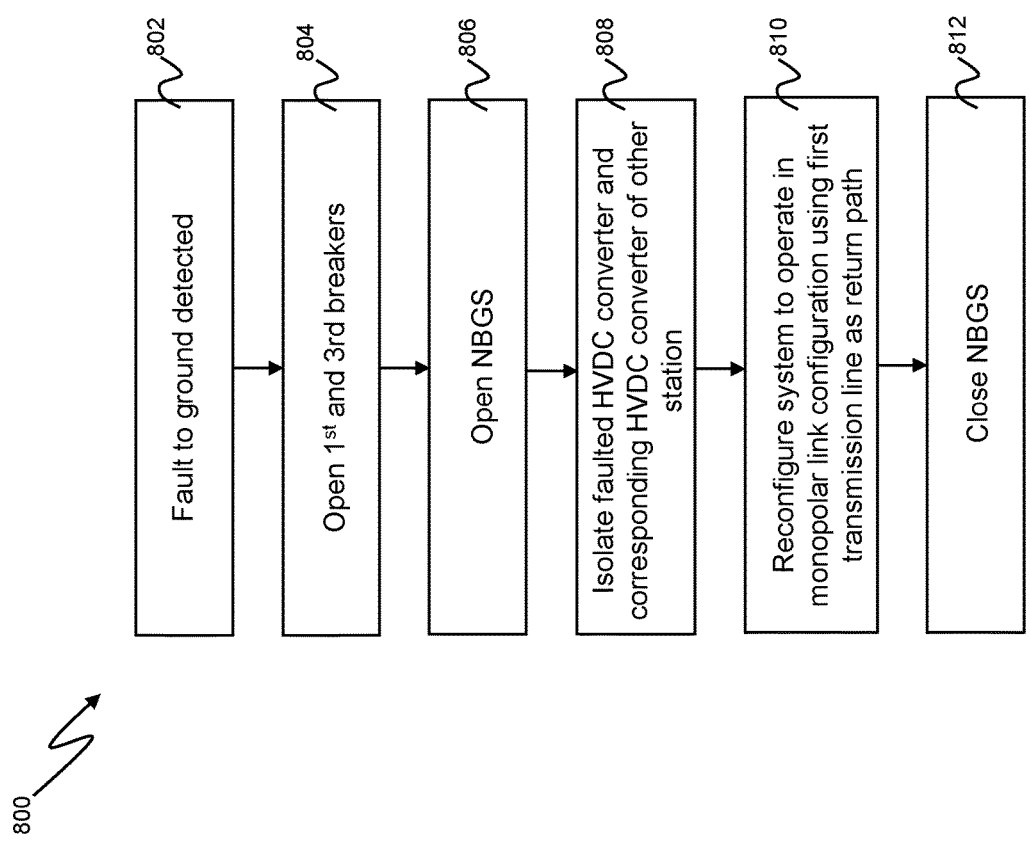
FIG. 8 is a flow diagram illustrating steps in a method for reconfiguring the HVDC transmission system of FIG. 6.

FIG. 8 is a flow diagram illustrating steps of a method 800 performed by the first and second controllers 106, 108 in order to reconfigure the system 600 to operate in the monopole configuration of FIG. 7d in which the first transmission line 200 is used as a current return path.

In a first step 802, a fault to ground is detected in one of the HVDC converters 110, 130, 150, 170 of the system 300 by either the first controller 106 or the second controller 108. In the example discussed above the fault occurs in the third HVDC converter 150, which is part of the second station 104 and thus may be detected by the second controller 108. It will be appreciated that corresponding steps will be performed using the appropriate AC breakers, disconnectors and high-speed switches of the system 600 in the event that a fault is detected in one of the other HVDC converters 110, 130, 170.

At step 804, the first and second controllers 106, 108 issue commands to the first, and third AC breakers 112, 152 to cause them to open.

At step 806, the first controller 106 issues a command to the NBGS 312 to cause it to open.

In order to reconfigure the system 600 to use the first transmission line 200 as a current return path, at step 808 the first and second controllers 106, 108 issue commands to cause the first high-speed switch 302 of the link 126 of the first station 102 and the third high-speed switch 306 of the link 166 of the second station 104 to close. The first controller 106 also issues commands to the DMRTB 612, and the MRTB 614 to cause them to open.

At step 810, the second controller 108 issues control signals to the second and third disconnectors 158, 162 of the second station 104 to cause the second and third disconnectors 158, 162 to open, thereby isolating the third HVDC converter 150. The first controller 106 may also issue control signals to the first and third disconnectors 116, 122 of the first station 102 to cause the first and third disconnectors 116, 122 to open, thereby isolating the first HVDC controller 110.

At step 812, the first controller 106 issues a command to the NBGS 312 to cause it to close.

The systems and methods described above are suitable for use with HVDC converters of different types. For example, the HVDC converters 110, 130, 150, 170 may be line commutated converters (LCCs) or voltage source converters (VSCs).

As will be appreciated from the foregoing, the systems and methods described above provide a cost effective mechanism for rapidly reconfiguring bipolar HVDC transmission systems in the event that a fault is detected.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality. Any reference signs in the claims shall not be construed so as to limit their scope.

The invention claimed is:

1. A high voltage direct current transmission system comprising:
    a first station comprising first and second HVDC converters coupled in series via a first disconnector and a second disconnector;
    a second station comprising series-connected third and fourth HVDC converters, wherein a neutral node coupling the third HVDC converter to the fourth HVDC converter is coupled to earth;
    a first transmission line connecting a positive node of the first HVDC converter to a corresponding positive node of the third HVDC converter, wherein a first pole of the system comprises the first HVDC converter, the third HVDC converter and the first transmission line;
    a second transmission line connecting a negative node of the second HVDC converter to a corresponding negative node of the fourth HVDC converter, wherein a second pole of the system comprises the second HVDC converter, the fourth HVDC converter and the second transmission line;
    wherein a neutral node between the first disconnector and the second disconnector is coupled to a parallel combination of a resistance and a neutral bus ground switch for coupling the neutral node to earth.

2. The HVDC transmission system according to claim 1, wherein:
    the first station comprises a first link coupled at a first end to the first transmission line and coupled at a second end to the second transmission line, the first link comprising series-connected first and second high-speed switches, wherein a third node connecting the first and second high-speed switches is coupled to the neutral node of the first station, and wherein the first and second high-speed switches are selectively operable to couple either the first transmission line or the second transmission line to the neutral node of the first station;
    the second station comprises a second link coupled at a first end to the first transmission line and coupled at a second end to the second transmission line, the second link comprising third and fourth high-speed switches, wherein a fourth node connecting the third and fourth high-speed switches is coupled to the neutral node of the second station, and wherein the second and third high-speed switches are selectively operable to couple either the first transmission line or the second transmission line to the neutral node of the second station.

3. The HVDC transmission system according to claim 1 wherein the neutral node of the second station is coupled to a surge arrestor for coupling the neutral node to earth.

4. The HVDC transmission system according to claim 1 wherein the first, second, third and fourth HVDC converters comprise line commutated converters.

5. The HVDC transmission system according to claim 1 wherein the first, second, third and fourth HVDC converters comprise voltage source converters.

6. The HVDC transmission system according to claim 1 further comprising a dedicated metallic return coupling the neutral node of the first station to the neutral node of the second station.

7. A method for reconfiguring the system of claim 6 on detection of a fault to ground in one of the first, second, third or fourth HVDC converters, the method comprising:
    detecting the fault;
    isolating the HVDC converters of the faulted pole containing the HVDC converter in which the fault occurred from respective AC transmission terminals; and
    opening the neutral bus ground switch so as to cause leakage current in the system to flow through the resistance.

8. The method according to claim 7, further comprising:
coupling the transmission line of the faulted pole to the neutral nodes of the first and second stations, such that the coupled transmission line provides a return path for current in the healthy pole; and
isolating the HVDC converter in which the fault occurred from the HVDC converters of the healthy pole and from the coupled transmission line.

9. The method according to claim 8, further comprising:
closing the neutral bus ground switch.

10. A method for reconfiguring the system of claim 1 on detection of a fault to ground in one of the first, second, third or fourth HVDC converters, the method comprising:
detecting the fault;
isolating at least the HVDC converters of the faulted pole containing the HVDC converter in which the fault occurred from respective AC transmission terminals;
opening the neutral bus ground switch so as to cause leakage current in the system to flow through the resistance;
coupling the transmission line of the faulted pole to the neutral nodes of the first and second stations, such that the coupled transmission line provides a return path for current in the healthy pole in which the fault did not occur; and
isolating the HVDC converters of the faulted pole from the HVDC converters of the healthy pole and from the coupled transmission line.

11. The method according to claim 10 further comprising:
after isolating the HVDC converters of the faulted pole from the HVDC converters of the healthy pole and from the coupled transmission line, closing the neutral bus ground switch.

12. A HVDC converter station comprising:
first and second HVDC converters coupled in series via a first disconnector and a second disconnector, the first HVDC converter comprising a positive node configured to be coupled to a first transmission line, the second HVDC converter comprising a negative node configured to be coupled to a second transmission line, wherein:
a neutral node between the first disconnector and the second disconnector is coupled to a parallel combination of a resistance and a neutral bus ground switch for coupling the neutral node to earth.

13. The HVDC converter station according to claim 12, further comprising:
a link configured to be coupled at a first end to the first transmission line and configured to be coupled at a second end to the second transmission line, the first link comprising series-connected first and second high-speed switches, wherein a node connecting the first and second high-speed switches is coupled to the neutral node, and wherein the first and second high-speed switches are selectively operable to couple either the first transmission line or the second transmission line to the neutral node of the first station.

14. The HVDC converter station according to claim 12, wherein the first and second HVDC converters comprise line commutated converters.

15. The HVDC converter station according to claim 12, wherein the first and second HVDC converters comprise voltage source converters.

* * * * *